July 6, 1937.　　　　　G. KLIMT　　　　　2,086,422
TOOL HANDLE FASTENER
Filed June 9, 1936
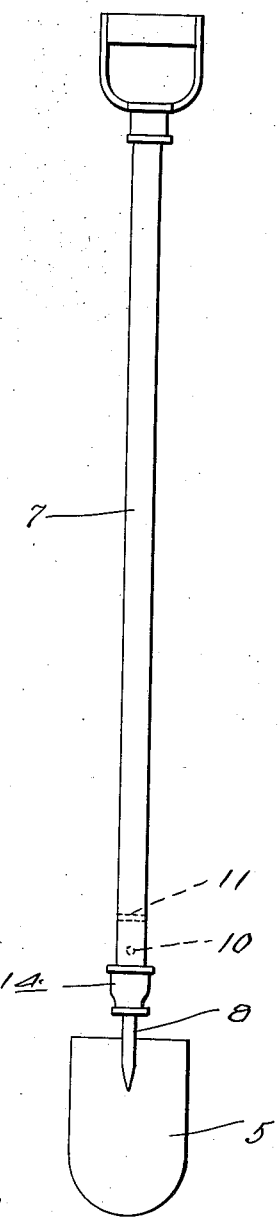
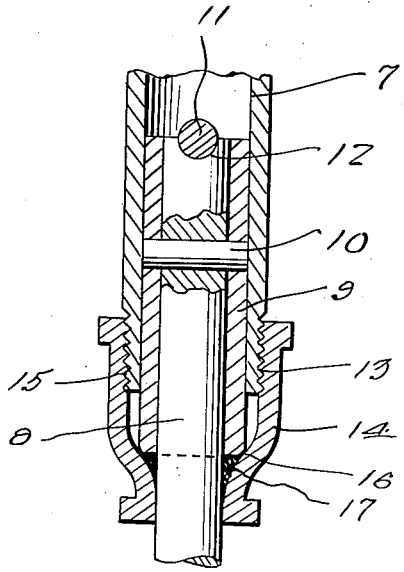
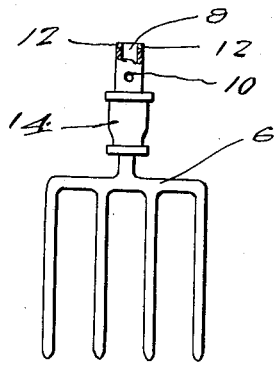
Inventor
George Klimt
By Clarence A. O'Brien
Hyman Berman
Attorneys Patented July 6, 1937

2,086,422

UNITED STATES PATENT OFFICE 2,086,422

TOOL HANDLE FASTENER

George Klimt, Chicago, Ill.

Application June 9, 1936, Serial No. 84,373

2 Claims. (Cl. 306—41)

This invention relates to tool handle fasteners and the object of the invention is to provide an improved means for detachably connecting to a suitable handle provided therefor a tool blade, such as a spade, fork, or the like, to the end that such blade may be associated with its handle in a positive yet quick detachable manner.

The invention together with its objects and advantages will be best understood from a study of the following description taken in connection with the accompanying drawing wherein:—

Figure 1 is an elevational view of a garden tool and illustrating the application of my invention thereto.

Figure 2 is an enlarged detail sectional view showing the manner of securing a blade and handle together.

Figure 3 is a view mostly in elevation but with certain parts broken away and shown in section and illustrating the application of the invention to a second type of garden tool.

Referring to the drawing by reference numerals it will be seen that, in accordance with the present invention there is provided for use with any one of several varieties of blades, as for example for use with a hoe blade 5 or a pronged blade or fork 6, a handle 7.

The handle 7 is of more or less conventional structure and in the present instance includes a tubular shank portion into the free end of which is insertable the tang or shank 8 of the garden blade whether the blade be in the form of a hoe blade such as shown at 5 or of a pronged blade such as shown as at 6 or any other type of blade.

Further in accordance with the present invention there is sleeved onto the free end of the blade shank or tang 8 a tubular member 9 and the same is secured on the tang 8 against longitudinal and rotative movement relative to the tang through the medium of a pin 10 that extends transversely through the tang 8 and has its ends engaging in openings provided in diametrically opposite portions of the sleeve 9.

Also secured transversely within the shank 7 of the handle is a fixed pin 11, and at right angles to the pin 10. The tang 8 and the sleeve 9 in their corresponding ends are provided with grooves or notches indicated generally at 12 to engage the pin 11 in the manner clearly shown in Figure 2. Thus it will be seen that pin 11 will limit inward movement of the sleeve equipped end of the tang 8 relative to the handle shank 7 and will also serve to retain the shank 8 and sleeve 9 against rotative movement relative to the handle shank 7.

Further in accordance with the present invention, at its free end thereof the handle shank 7 is externally threaded as at 13 and sleeved onto the tang 8 is a bushing 14 which has a relatively large diameter at one end and which at said end is internally threaded as at 15 for screw-threaded engagement with the end 13 of the handle 7. At its relatively opposite end the bushing 14 is diametrically reduced so as to have a snug fit on the tang 8 and also to present internally of the bushing a shoulder portion 16 which abuts the outermost end of the sleeve 9 when the bushing 14 is threaded home on the handle shank 7. It will thus be seen that with the shoulder portion of the bushing 14 abutting the adjacent end of the sleeve 9 the grooved ends 12 of the tang 8 and sleeve 9 will be secured in positive engagement with the pin 11 to the end that the handle 7 and blade 5, or blade 6, as the case may be, are secured together in a positive, rigid and efficient manner.

To uncouple the blade and handle all that will be necessary will be to unscrew the bushing 14 whereupon the sleeve equipped end of the tang 8 may be readily slid outwardly from the lower end of the handle shank 7.

It will thus be seen that the handle 7 may be used with any one of several different types of blades provided of course each of the blades is provided with a tang 8 and a sleeve 9 or their equivalents as contemplated by the present invention.

As shown in Figure 2 a washer or packing 17 of felt or other suitable material treated with grease, graphite or the like is sleeved onto the tang 8 to fit snugly within the lower portion of the bushing 14 in varying contact with the lower end of the sleeve member 9. The washer or packing 17 will thus preclude the roughening of the part as would otherwise tend to interfere with a quick changing from one blade to another. By protecting the part against rust it will be seen that the connection may be made quickly and easily by hand and without resort to tools of any kind or description.

Having thus described the invention what is claimed as new is:—

1. In a tool of the character described, a handle having a shank one end of which at least is tubular, a blade having a shank, a sleeve on the shank of the blade, interengaging means on said sleeve and the blade shank for securing the sleeve against rotative and axial displacement relative to the blade shank, the sleeve equipped end of said blade shank fitting snugly within the tubular end of the handle shank, means inwardly of said handle shank constituting a stop engaging the inner ends of the blade shank and sleeve for limiting inward movement of the blade shank and sleeve relative to the handle shank and for retaining said blade shank against rotative movement relative to the handle shank, said handle shank at said tubular end being externally threaded, and a bushing disposed about the blade shank and having an end threadedly engaging the threaded end of the handle shank, and also being provided internally with a shoulder abutting the free end of said sleeve for positively securing the sleeve equipped end of the blade shank within the tubular end of said handle shank.

2. In combination, a handle having a tubular free end, a blade having a shank fitting within the free end of said handle, and interengaging means on said handle and the blade shank for securing the blade shank and handle assembled, and including a bushing sleeved on the blade shank and having threaded engagement with said handle, a pin fixed to and extending transversely of the handle, said shank having a notch formed in its inner end within which the pin is seated to limit inward movement of the shank and also to prevent relative rotation between the shank and handle and an element fixed to the blade shank and engaged by the bushing for forcing the blade shank inwardly against said pin.

GEORGE KLIMT.